US012747093B2

(12) United States Patent
Martino

(10) Patent No.: US 12,747,093 B2
(45) Date of Patent: Sep. 29, 2026

(54) DUAL STORAGE AND DISPOSAL DEVICE AND METHOD OF USE

(71) Applicant: Joseph Martino, Hamilton, VA (US)

(72) Inventor: Joseph Martino, Hamilton, VA (US)

(*) Notice: Subject to any disclaimer, the term of this patent is extended or adjusted under 35 U.S.C. 154(b) by 0 days.

(21) Appl. No.: 18/825,520

(22) Filed: Sep. 5, 2024

(65) Prior Publication Data

US 2024/0425272 A1 Dec. 26, 2024

Related U.S. Application Data

(63) Continuation-in-part of application No. 17/513,591, filed on Oct. 28, 2021, now abandoned.

(60) Provisional application No. 63/109,536, filed on Nov. 4, 2020.

(51) Int. Cl.
*B65F 1/00* (2006.01)
*B65D 90/00* (2006.01)
*B65D 90/66* (2006.01)

(52) U.S. Cl.
CPC .......... *B65F 1/004* (2013.01); *B65D 90/0033* (2013.01); *B65D 90/66* (2013.01); *B65D 2590/666* (2013.01)

(58) Field of Classification Search
CPC .......... B65F 1/02; B65F 1/006; B65F 1/0033; B65F 1/002; B65F 1/004; B65F 1/08; B65D 90/008; B65D 90/0066; B65D 88/1643
See application file for complete search history.

(56) References Cited

U.S. PATENT DOCUMENTS

| | | | | |
|---|---|---|---|---|
| 1,511,613 A * | 10/1924 | Joern | B65F 1/02 220/345.5 |
| 4,603,787 A | 8/1986 | Essary | |
| 5,111,958 A * | 5/1992 | Witthoeft | B65F 1/0073 220/23.88 |
| 5,383,703 A * | 1/1995 | Irvine, III | B62D 63/061 296/24.45 |
| 6,047,843 A * | 4/2000 | Mecke | B65F 1/006 220/23.88 |
| 7,895,956 B2 | 3/2011 | O'Connor | |
| 7,966,675 B2 | 6/2011 | Matejka | |
| 9,771,730 B2 | 9/2017 | Matejka | |
| 9,903,128 B2 * | 2/2018 | Lisk | E04H 4/0018 |
| 2012/0296781 A1 | 11/2012 | Edwards | |
| 2019/0144202 A1 * | 5/2019 | Ignacio | B65F 1/006 220/23.88 |

FOREIGN PATENT DOCUMENTS

| | | | |
|---|---|---|---|
| CN | 205906532 | 1/2017 | |
| CN | 110406850 | 11/2019 | |
| CN | 110949904 | 4/2020 | |
| KR | 20100110426 A * | 10/2010 | B65F 1/14 |

* cited by examiner

*Primary Examiner* — Anthony D Stashick
*Assistant Examiner* — Raven Collins
(74) *Attorney, Agent, or Firm* — Jonathan Brown

(57) ABSTRACT

A dual storage and disposal device with components combined in a specific way to provide a device capable of providing both on-site storage and disposal capability. The device includes a front wall with attachment apparatus, side walls, bottom, and a rear wall capable of opening as a door and a dividing wall. The device achieves its dual roles by comprising both a storage facility portion and a dumpster portion capable if independent operation.

8 Claims, 6 Drawing Sheets

DUAL STORAGE AND DISPOSAL DEVICE AND METHOD OF USE

CROSS REFERENCE TO RELATED APPLICATION(S)

This application claims the benefit of, U.S. provisional application No. 63/109,536 entitled "DUAL STORAGE AND DISPOSAL DEVICE AND METHOD OF USE," filed on Nov. 4, 2020. The subject matter of this application is hereby incorporated by reference in its entirety This application is also a Continuation in Part of, U.S. application Ser. No. 17/513,591 entitled "DUAL STORAGE AND DISPOSAL DEVICE AND METHOD OF USE," filed on Oct. 28, 2021 and claims the benefit thereof. The subject matter of this application is hereby incorporated by reference in its entirety

TECHNICAL FIELD OF THE INVENTION

The present invention relates to the general art of on-site disposal, storage and project logistical support, and more specifically to an apparatus and method for more efficient storage and disposal for on-site projects.

BACKGROUND OF THE INVENTION

Construction and building renovation projects come in a variety of sizes, scopes, and available space to carry out work and bring in equipment. Parking for equipment, in some cases, may be plentiful, but often, it is not. Often, such projects are in an urban setting where parking is very limited and space is at a premium. Even in a more rural setting, space may be limited by driveway or road size limitations, or other equipment already parked on a property.

One issue that is more or less constant at any such job site is the removal of debris. This may be, for example, debris already present on site (such as at an older, crumbling building), debris from the removal or portions of a structure to begin new work (such as removal of a wall, kitchen or bathroom fixtures, damaged ceilings or roofs, etc), or debris created by new construction, such as leftover wood from sawing, portions of unused tiles or shingles, etc.).

Such disposal is typically handled by bringing in an onsite dumpster. The dumpster is parked, debris thrown in, and the dumpster is removed. Typically, dumpsters are a standard length of 14 m 16 or more typically, 22 feet that fit onto the back of a truck for delivery. However, because a dumpster is typically brought in on a large truck, a large amount of length and overhead clearance is required to deliver even a single dumpster. This can be problematic in tight areas with limited space, making the delivery of even a single container difficult, let alone multiple containers, difficult.

Further, tools and other equipment must be brought to a job site for use. This is typically done by bringing the tools in multiple vehicles of those working on a specific project. This can be unsatisfactory as these tools are often lost, stolen, or left somewhere and forgotten. This also makes coordination to make sure all necessary tools and equipment are on a site more difficult. Someone having to go retrieve, find or buy some item that is not present is a common occurrence. This is inefficient, raising costs and often slows or stalls progress.

Another alternative is to leave any tools or equipment within a structure that is being worked upon. This can be unsatisfactory if people are still residing or working there.

Further, some structures under construction are easily broken into and this is a common occurrence.

Sometimes, a traditional roll off dumpster and traditional storage container or an enclosed trailer might be used to address both problems. However, this can take up much limited space, be excessively expensive for a project of more limited scope, and may not even be possible because of space limitations. Often if room is too limited, debris may be unsafely stored around the job site "here and there" resulting in unwanted hazards.

Besides being costly or perhaps not even possible, this is likely to result in more trips and deliveries, bringing more truck traffic to the job site. This can be problematic, particularly in urban or other settings with limited access for traffic, or areas (such as tourist towns or places with noise or hour restrictions) where one is trying to keep a low profile on construction activity.

SUMMARY

A dual storage and disposal device and method of use is shown. The storage and disposal system device is, overall, comprised of a front wall, a rear wall, a bottom plate, a first side wall on one side of the device, and a second side wall on the opposite side of the first side wall.

The device further comprises apparatus for transporting the device on a truck or similarly capable vehicle. In one embodiment, the transport apparatus is comprised of a set of rollers beneath the device at the bottom plate in proximity to the rear wall, and it is further comprised of a hook lift attachment assembly and a hook lift bar located at the device front wall.

The device is comprised of a pair of distinct portions; a storage facility 30, and a dumpster portion.

Turning to the storage facility portion, it is comprised generally of a storage facility front wall portion at the front of the storage facility, a storage facility rear wall portion at the rear of the storage facility, the first side wall of the device which acts as one side wall of the storage facility, and a dividing wall between the storage facility and dumpster portion that is also a second side wall of the storage facility. A roof or top is provided for overhead securing and protection. The roof or top can be in the form of a top. Apparatus for attaching it to the storage facility portion can be provided. If it is in the form of a roof, the roof is slanted to allow for drainage of rain or snow, or allow anything that lands on the roof to slide off. A door is provided at the front of the storage facility.

The door of the storage facility is comprised of hinges and a means of opening the door, and the door can be further comprised of a securing mechanism for locking the door into a closed position. This can be a lock, tabs and pins, or other means in the art. In one embodiment, a set of tabs and pins are used.

The dumpster portion is comprised of the dividing wall, which is also the front wall of the dumpster portion, a pair of dumpster side walls, the device rear wall, and bottom portion. The dumpster portion can be further comprised of rear wall opening and securing apparatus to make the real wall open-able or secure it when closed.

DETAILED DESCRIPTION OF PREFERRED EMBODIMENTS

Disclosed herein is a dual storage and disposal system and methods for manufacture, implementation and use.

Figure 1:
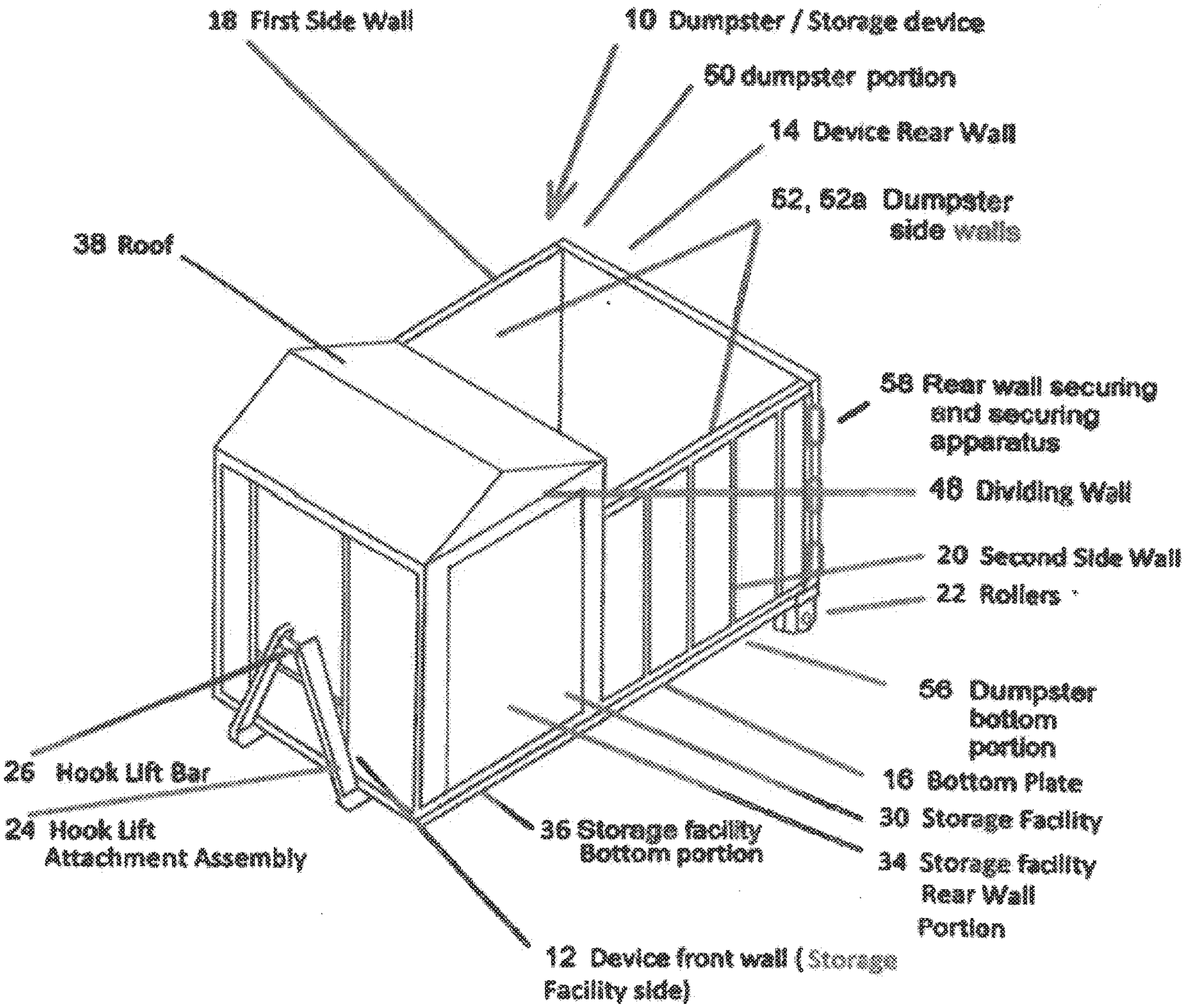
FIG. 1 is a schematic diagram of a preferred embodiment of the invention.

Turning to FIG. 1, the storage and disposal system device ("device") 10 is, overall, comprised of a front wall 12, a rear wall and/or door 14, a bottom portion 56, a first side wall 18 on one side of the system device 10, and a second side wall 20 on the opposite side of the device 10 in relation to the first side wall 18.

The front wall 12, first side wall 18 on one side of the system device 10, and the second side wall 20 on the opposite side of the device 10 in relation to the first side wall 18 are rigidly, and non-movably, attached to the bottom portion 56.

The device 10 further comprises apparatus for transporting the device on a truck or similarly capable vehicle. In this embodiment, the transport apparatus is comprised of a set of rollers 22 beneath the device 10 at the bottom portion 56 in proximity to the rear wall and/or door 14 of the device 10.

Figure 3:
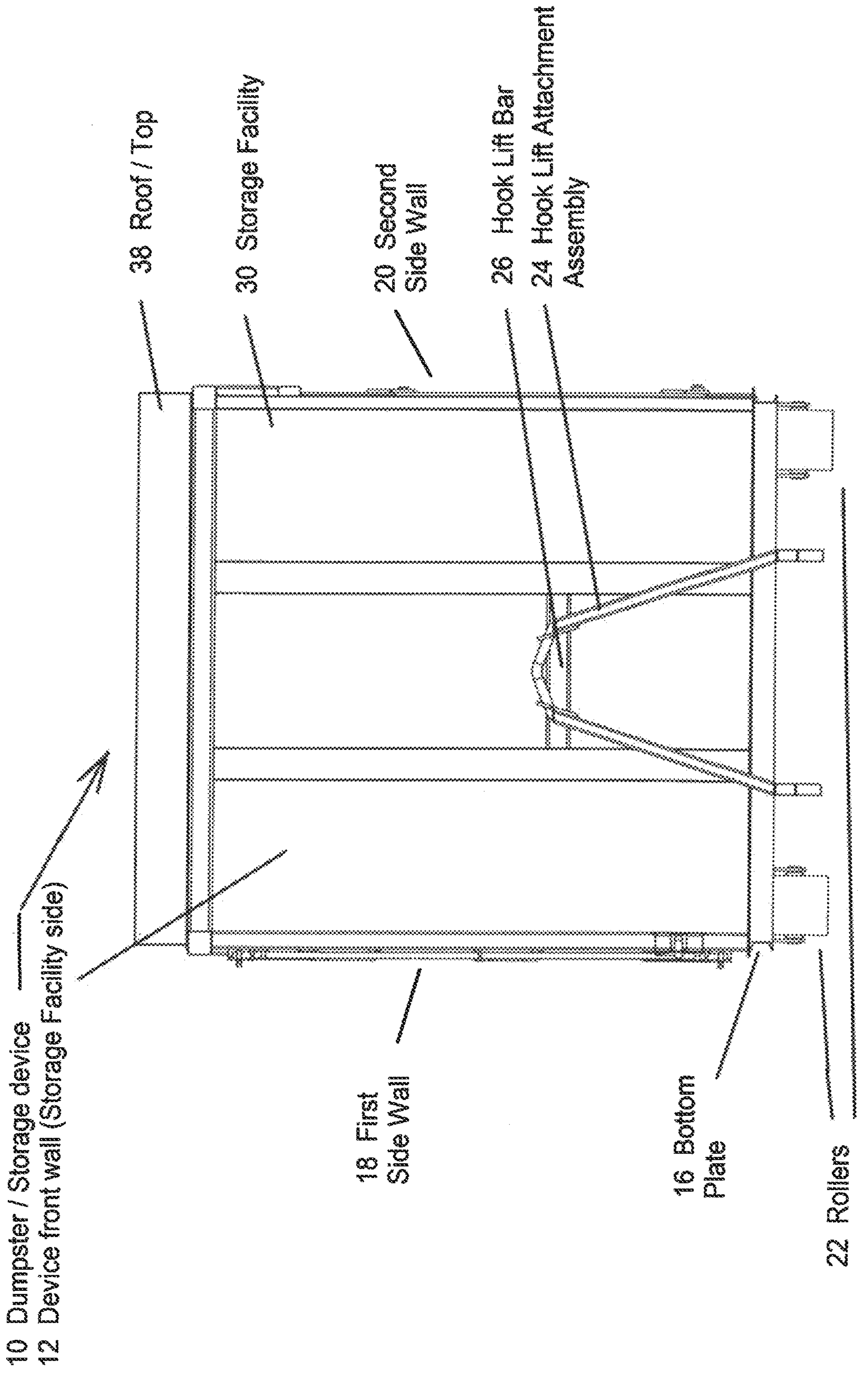
FIG. 3 is a schematic front view of the embodiment of FIG. 1.

Turning to FIG. 3, the device 10 is further comprised of a hook lift attachment assembly 24 and a hook lift bar 26 located at the device front wall 12. By these means, a truck or vehicle can attach the device 10 and pull it onto, or take it off of, a truck bed platform or other platform as desired.

Returning to FIGS. 1-2, the device 10 is comprised of a pair of general distinct portions; a storage facility 30, and a dumpster portion 50.

Turning to the storage facility portion 30, it is comprised generally of a storage facility front wall portion 32 at the front of the storage facility 30 and rear wall portion 34 at the rear of the storage facility 30. Because of the storage facility 30 positioning in this embodiment, the front wall portion 32 and the rear wall portion 34 are comprised of a portion of the first side wall and second side wall 18, 20.

The storage facility portion 30 is further comprised of a dividing wall 48 between the storage facility 30 and dumpster portion 50 that, because of its location and orientation, is also a second side wall of the storage facility 30. The dividing wall 48, like the storage facility front wall portion 32, rear wall portion 34 first side wall 18, and device front wall that is also a storage facility side wall 12, is rigidly, and non-movably, attached to the bottom plate 16. The dividing wall 48 and storage facility side wall 12, are also rigidly attached to the respective storage facility front wall portion 32 and rear wall portion 34 to achieve the purpose of secure storage.

A roof or top 38 is provided for overhead securing and protection. This can be in the form of roof, a top, or other suitable component. In this embodiment, and as shown in FIG. 1, a roof is provided. A top can be further comprised of a top attachment and securing apparatus.

For clarity, it is noted that the overall device 10 is oriented such that the front wall 12, containing the attachment apparatus is at the front of the device 10 and the rear wall and/or door 14 is at the rear of the device. For further clarity, the front wall portion 32 and rear wall portion 34 of the storage facility are orientated at 90 degrees to the front wall 12, and rear wall and/or door 14 of the overall device. Turning additionally to FIG. 3, the front wall 12 of the device serves as a side wall of the storage facility 30. Returning to FIGS. 1-2, accordingly, the first side wall 18 of the device 10 is oriented to the frontal side of the storage facility 30, and the second side wall 20 is orientated to the rear side of the storage facility 30. The dumpster portion 50 is similarly oriented, such that the dividing wall 48 is the "front" of the dumpster portion 50 and the rear wall and/or door 14 is at the rear.

Figure 2:
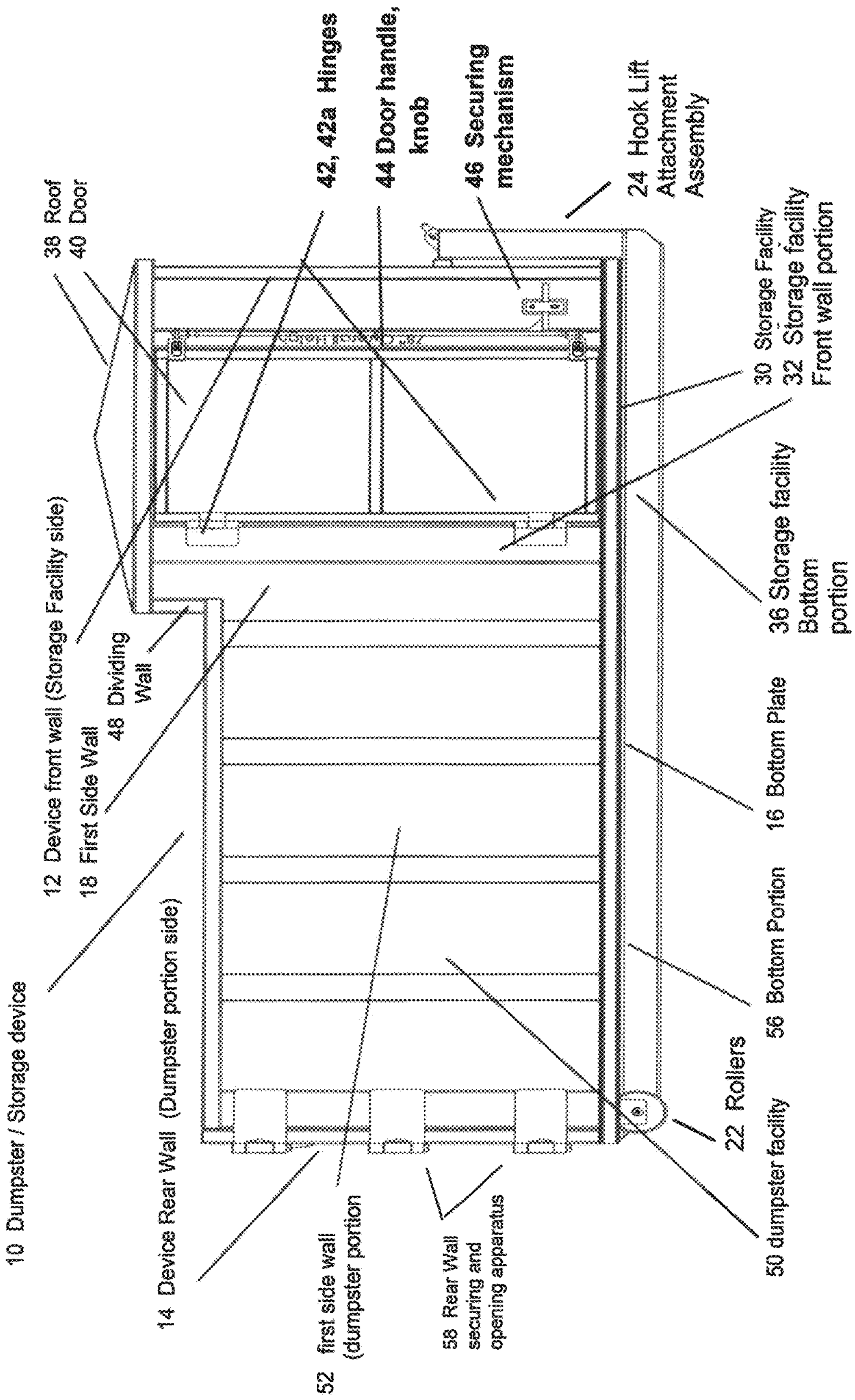
FIG. 2 is a schematic side view of the embodiment of FIG. 1.

Turning to FIGS. 2, for ease of discussion, the "front" of the storage facility 30, is the side having the door 40.

Returning to FIG. 1, the bottom portion 56 of the overall device 10 is comprised of the storage facility bottom portion 36 and dumpster bottom portion. Turning focus to the dumpster portion 50, the device side wall 18 is comprised of the storage facility front wall portion and a dumpster side wall 52, and the second side wall 20 is comprised of the storage facility rear wall portion 34 and other dumpster side wall 52*a*. These divisions are partly denoted by physical portions of the device 10, but also as conceptual aids in discussing the separate portions of the device 10. The dumpster portion 50 is more specifically comprised of the dividing wall 48, which is also the front wall of the dumpster portion 50, a pair of dumpster side walls 52, 52*a*, the device rear wall and/or door 14, and bottom portion 56.

Both the dumpster facility 30 and the dumpster portion 50 are rigidly attached to the bottom portion 56. More specifically, in an embodiment, the device front wall 12, first side wall 18 and second side wall 20 are each rigidly and non-movably attached to the bottom portion 56. In another embodiment, the rear wall or door 14 is also rigidly and non-movably attached to the bottom portion 56.

Further, the device front wall 12 and dividing wall 48 are each rigidly and non-movably attached to the first side wall 18 and second side wall 20. In another embodiment, the rear wall or door 14 is also rigidly and non-movably attached to the first side wall 18 and second side wall 20

Turning to FIG. 2, a door 40 is provided at the front of the storage facility portion 30. The door 40 of the storage facility 30 is comprised of a door, hinges 42, 42*a* and a means of opening the door 40. Typically, this is a handle or knob and in this embodiment, is a door knob 44. The door can be further comprised of a securing mechanism 46 for locking the door into a closed position. This can be a lock, tabs and pins, or other means in the art. In this embodiment, a set of tabs and pins are shown.

Further, in this embodiment, the roof or top 38 is a roof. Typically, the roof 38 is slanted to allow for drainage of rain or snow, or allow anything that lands on the roof 38 to slide off. This provides protection to the structure and to anything stored inside the structure.

Figure 4:
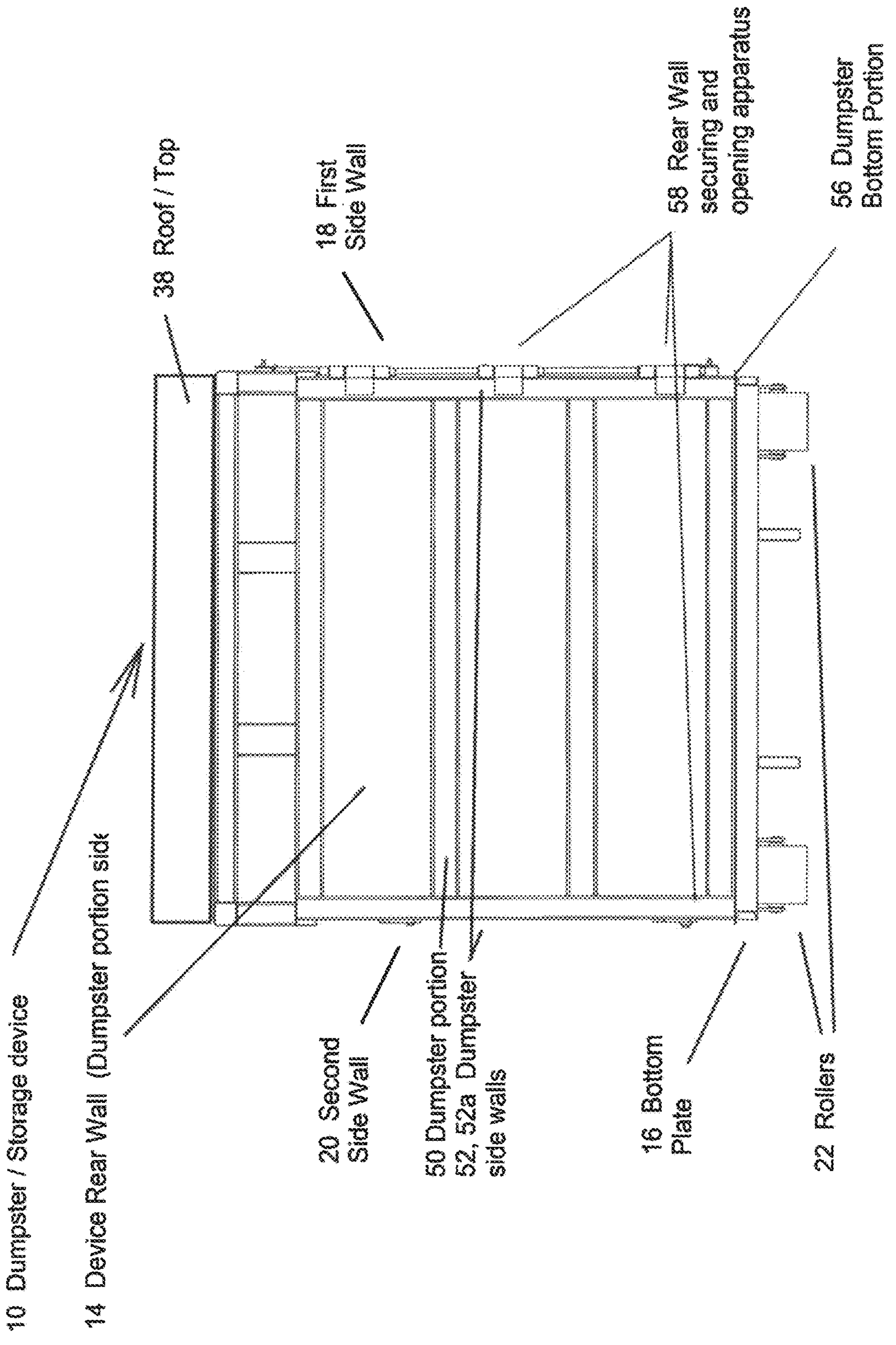
FIG. 4 is a schematic rear view of the embodiment of FIG. 1.

Turning to FIG. 4, in this embodiment, the real wall and/or door 14 is comprised of a door capable of opening for ease of emptying the dumpster portion 50. The dumpster portion 50 can be further comprised of rear wall opening and securing apparatus 58 to make the real wall and/or door 14 open-able or secure it when closed.

Figure 5:
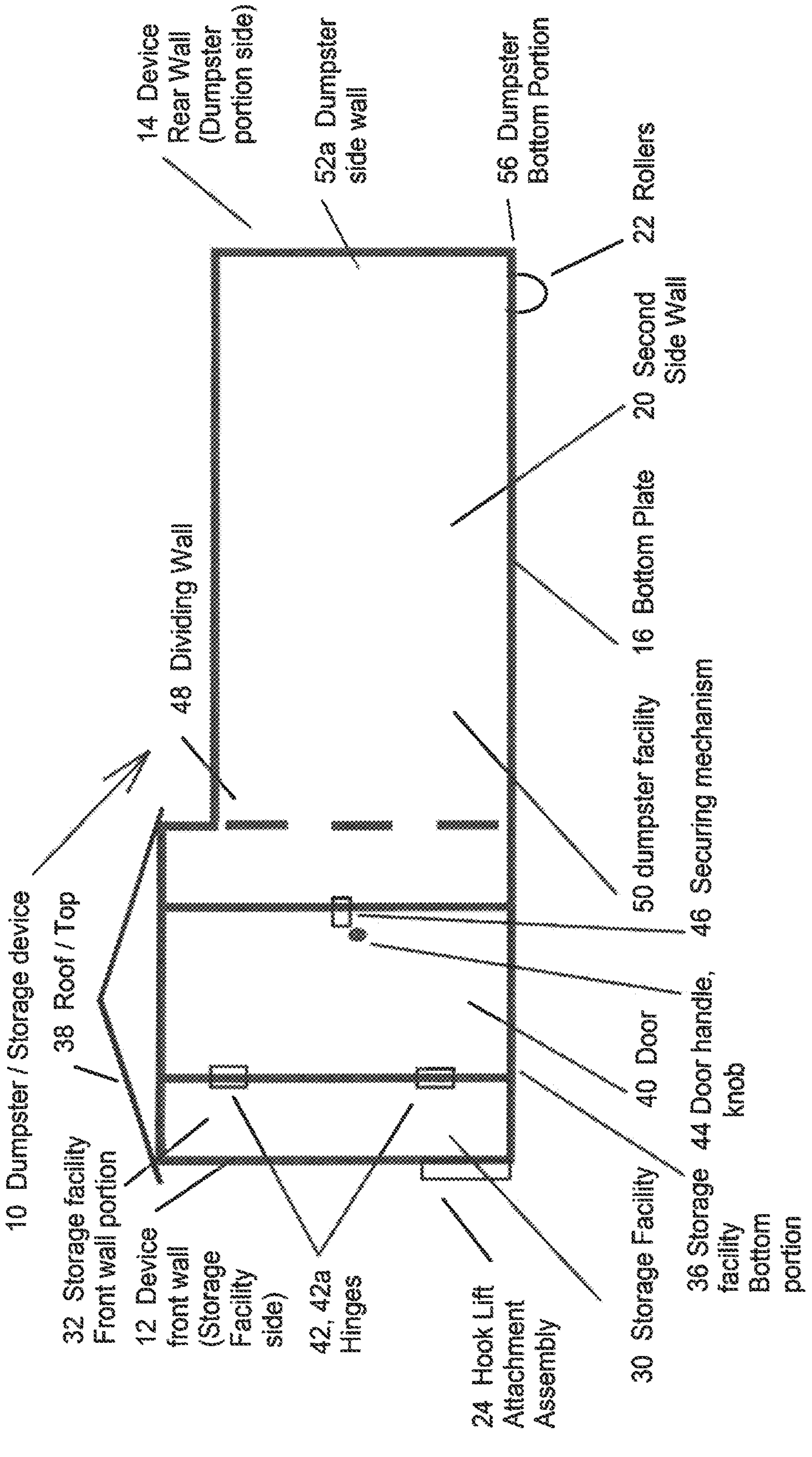
FIG. 5 is a schematic diagram of a side view of an alternate embodiment of the invention.

The portions of the device 10 can also be in differing orientations. Turning to FIG. 5, the device 10 is shown with the door 40 on the opposite side of the dumpster facility 30 as in the previous embodiment. Further, the dividing wall 48 is shown in further detail.

Figure 6:
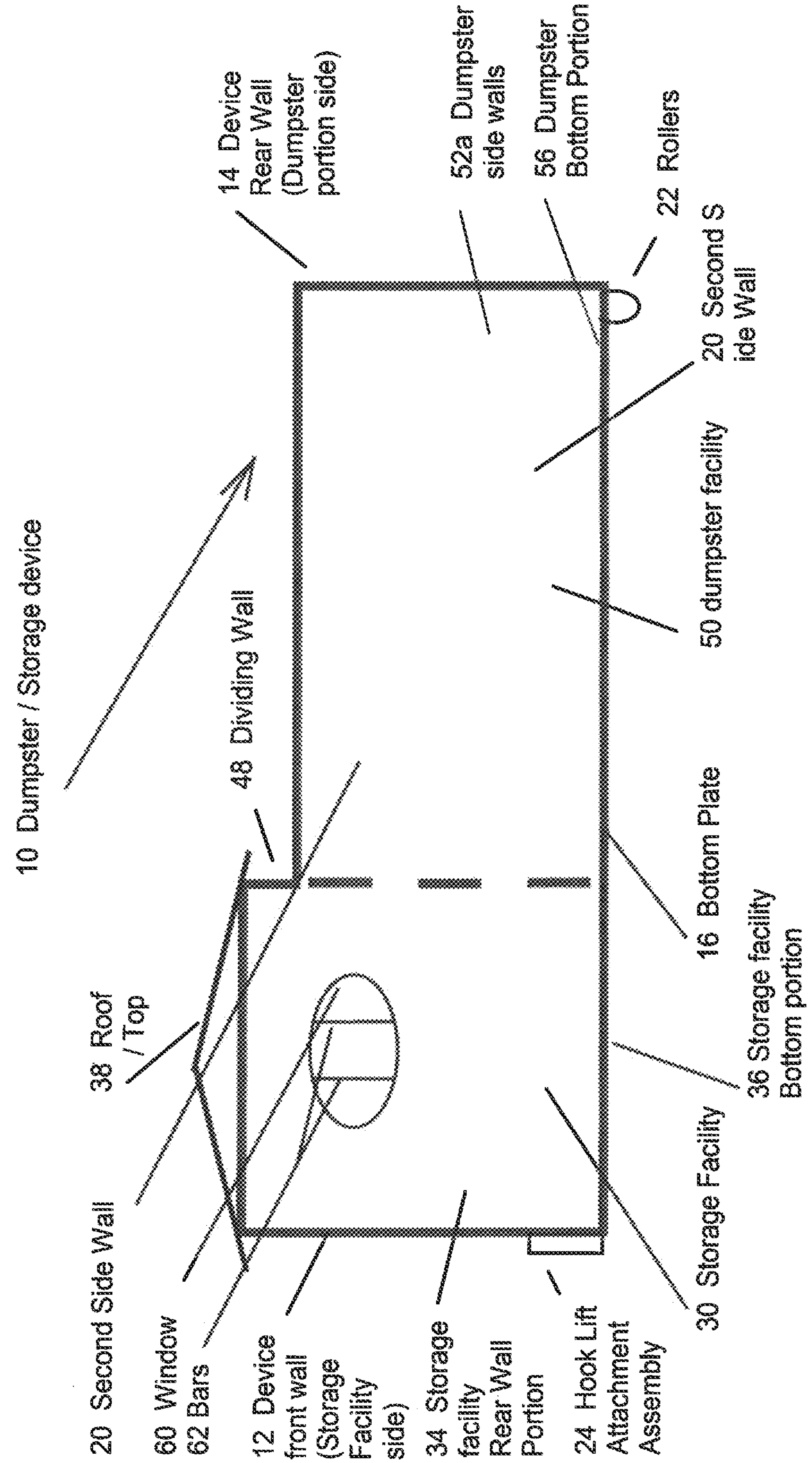
FIG. 6 is a schematic diagram of the opposite side view to that shown in the embodiment of FIG. 5.

Turning to FIG. 6, additions can be made to the storage facility 30 to enhance its function as a storage facility. In this view, the embodiment of FIG. 5 is reversed and a window 60 has been placed at the back of the storage facility 30. The window 60 can be of any material that is securable to the wall 20 and difficult to break, such as, e.g., thick glass, or plastic or other resin. Bars 62 or other means of keeping the window from being used to break into the storage facility 30 can also be added, such as, in this embodiment, a set of bars 62. Having a window can both provide light for improved viewing when entering the storage facility 30, but can also provide a user the ability to "look around" and see what is in the storage facility 30 quickly.

The device can be any suitable size capable of being transported to a site and dropped off for use. Further, the storage shed portion 30 can be decreased or expanded in relation to the dumpster portion, depending upon such factors as uses of the device 10, and amount of tools relative to amount of expected collected debris. In this embodiment, the unit is 14 ft long, or 13-15 ft long, and 8 ft wide, or 7-9 ft wide, with each portion taking an equal amount of the length.

In another example embodiment, the device can be 16 ft long, or 15-17 ft long, and 8 feet wide, or 7-9 ft wide, wherein the front of the storage facility is 6 feet of the length and an open top dumpster is 10 ft of it.

Further, though in these embodiments, the dumpster is open top, a top and means for securing it can be added if necessary.

The device 10 can be constructed of any material or materials known in the art such as, steel, aluminum, or other metal, an alloy, plastic or other resin, wood, or any combination of these.

In this manner, a dual purpose device is provided and can be placed at a job site. The dumpster portion 50 can be used for collecting job waste materials, while the storage side provides secure storage for tools or supplies. This is particularly suited to projects that need tools or equipment, but not necessarily a full size dumpster. These could include, for example, projects such as single-room or other limited remodels, deck or fence builds or rebuilds, or work on a small building or small part of a building.

EXAMPLE

John is working on a room remodel in a house with limited access and parking. He needs some ability to dispose of debris, and a way to store tools and equipment while working on the job. Previously, he has left his tools at the site, but they sometimes disappear. He has also had he and his workers transport tools and equipment every day. However, this takes extra time that could be devoted to completing the job. Further, sometimes there are coordination problems and all the tools did not necessarily show up when needed. In addition, a tool would occasionally be lost in the confusion of work and be left outside, where it either disappeared or rain or other weather would come along in the night and ruin the tool.

John has the storage and dumpster device 10 dropped off. He only has to bring his tools one time. He stores them in the storage facility portion. As he proceeds with the job, tools are easy to find and return, while debris is simply thrown into the attached dumpster portion. At night, he locks up the storage portion 30, knowing his tools are secure from theft, out of the way, and protected from the elements. This is, in part, because the walls of the storage facility 30 are secured to each other and to the bottom portion 56. In the morning, he simply opens the storage facility portion 30 and can directly proceed with the work that day. This can save a number of useless or redundant trips to fetch or obtain tools or other equipment. The more limited space taken by the dual-use device 10 is also making access for his vehicle(s) and those of the building's owner(s) easier to maintain. When the job is completed, the device 10 is loaded onto a truck. If his tools and equipment are secure, John may even opt to leave them in the storage portion 30, while the device 10 is transported back to his shop or directly to another job. Through use of this device, John has increased his efficiency, saved money, saved inconvenience, and decreased the space taken for working on the job.

Disclosed herein is a dual storage and disposal device for effectively storing tools or equipment or other material, while also providing a means for collecting debris and material within the same space, thereby increasing operational efficiency, reducing costs, and improving the experience for users and their clients.

It is to be understood that while certain forms of the present invention have been Illustrated and described herein, the expression of these individual embodiments is for illustrative purposes and should not be seen as a limitation upon the scope of the invention. It is to be further understood that the invention is not to be limited to the specific forms or arrangements of parts described and shown.

The invention claimed is:

1. A method of assembling a dual storage and disposal device, comprising the steps of:

forming a disposal device front wall, connecting a first and second respective side walls to the disposal device front wall such that the first and second respective side walls are, opposite each other, attaching a bottom portion beneath the front wall, and first and second respective side walls, forming a dual storage and disposal device comprised of a storage facility portion and a dumpster portion, installing a dividing wall between at least a portion of the storage facility portion and at least a portion of the dumpster portion, wherein the storage facility portion is comprised of a portion of the first and second respective side walls, a portion of the bottom portion, at least a portion of the dividing wall, at least a portion of the disposal device front wall, and a roof or a top covering at least a portion of the storage facility, and wherein the dumpster portion is comprised of;

a portion of the first and second respective side walls, a portion of the bottom portion, at least a portion of the dividing wall, configuring the storage facility portion with at least one door configured to be entered or exited, configuring the dumpster portion with at least one rear door configured to be entered or exited, and wherein the disposal device front wall, the first and second respective side walls, and the dividing wall, are each rigidly and non-movably connected to the bottom portion, and wherein the disposal device front wall and the dividing wall are each rigidly and non-movably connected to the first and second respective side walls.

2. A method of assembling a dual storage and disposal device according to claim 1, wherein the portions of the storage facility comprised of the portions of the first and second respective disposal device side walls comprise a respective storage facility portion front wall, and a storage facility rear wall opposite the front wall.

3. A method of assembling a dual storage and disposal device according to claim 1, wherein the at least a portion of the disposal device front wall and the at least a portion of the dividing wall comprise a pair of side walls of the storage facility portion.

4. A method of assembling a dual storage and disposal device according to claim 1, wherein the portions of the storage facility comprised of the portions of the first and second respective disposal device side walls comprise a respective storage facility portion front wall, and a storage facility rear wall opposite the front wall, and wherein the at least one door of the storage facility portion is further comprised of at least one door located on the storage facility front wall, storage facility real wall, or both.

5. A method of assembling a dual storage and disposal device according to claim 1, comprising the further step of providing the storage facility portion with at least one window on at least one wall.

6. A method of assembling a dual storage and disposal device according to claim 1, wherein the portions of the dumpster portion comprised of the portions of the first and second respective disposal device side walls comprise a respective pair of dumpster portion side walls, at least a portion of the dividing wall comprises the front wall of the dumpster portion, and the at least one rear door of the dumpster portion is located between the respective pair of dumpster portion side walls and opposite the dumpster portion front wall.

7. A method of assembling a dual storage and disposal device according to claim 1, wherein the disposal device is 13 to 15 feet long and 7 to 9 feet wide, or 15-17 feet long and 7 to 9 feet wide.

8. A method of assembling a dual storage and disposal device according to claim 1, comprising the further step of providing a transport apparatus attached to the device.

* * * * *